(12) United States Patent
Smith

(10) Patent No.: US 9,357,758 B1
(45) Date of Patent: Jun. 7, 2016

(54) FISH-GRABBING TOOL

(71) Applicant: Darwin Smith, Rockford, IA (US)

(72) Inventor: Darwin Smith, Rockford, IA (US)

( * ) Notice: Subject to any disclaimer, the term of this patent is extended or adjusted under 35 U.S.C. 154(b) by 0 days.

(21) Appl. No.: 14/943,317

(22) Filed: Nov. 17, 2015

(51) Int. Cl.
*A01K 97/14* (2006.01)
*A01K 97/01* (2006.01)
*B25J 1/04* (2006.01)

(52) U.S. Cl.
CPC .............. *A01K 97/14* (2013.01); *A01K 97/01* (2013.01); *B25J 1/04* (2013.01)

(58) Field of Classification Search
CPC ............ A01K 97/01; A01K 97/14; B25J 1/04
USPC ................................. 294/19.3, 50.8, 115, 209
See application file for complete search history.

(56) References Cited

U.S. PATENT DOCUMENTS

| | | | | |
|---|---|---|---|---|
| 406,546 | A * | 7/1889 | Taber | A01K 97/14 294/19.3 |
| 1,489,581 | A * | 4/1924 | Lynch | A01K 97/14 294/100 |
| 1,961,421 | A * | 6/1934 | Hogenson | B25J 1/04 294/115 |
| 2,193,073 | A * | 3/1940 | Norton | A01K 97/14 294/100 |
| 2,241,308 | A * | 5/1941 | Koivu | A01K 97/14 294/19.3 |
| 2,482,576 | A * | 9/1949 | Comstock | B65G 7/12 294/115 |
| 2,584,881 | A * | 2/1952 | Johnson | B63B 17/00 294/19.3 |
| 3,208,786 | A | 9/1965 | Eddleman | |
| 3,833,252 | A | 9/1974 | Redding | |
| 3,978,605 | A * | 9/1976 | Maruniak | A01K 97/14 294/115 |
| 4,005,897 | A * | 2/1977 | Smith | A01K 97/14 294/115 |
| 4,783,926 | A | 11/1988 | McKinney | |
| 4,845,876 | A | 7/1989 | Dodson | |
| 5,119,585 | A | 6/1992 | Camp | |
| 5,370,432 | A * | 12/1994 | Kram | B25J 1/04 294/115 |
| D362,293 | S | 9/1995 | Formaggioni | |
| 5,832,651 | A | 11/1998 | Arntz | |
| 6,338,512 | B1 * | 1/2002 | Ruppert | A01B 1/02 294/50.8 |
| 6,438,891 | B1 * | 8/2002 | Aboczky | A01K 97/14 294/115 |
| 6,571,505 | B1 | 6/2003 | Poiencot, Jr. | |
| 6,968,644 | B1 | 11/2005 | Garcia | |
| 7,076,910 | B1 | 7/2006 | Xifra | |

FOREIGN PATENT DOCUMENTS

| CA | 2466285 A1 | 7/2007 |
|---|---|---|
| GB | 539531 | * 9/1941 |

* cited by examiner

*Primary Examiner* — Dean Kramer
(74) *Attorney, Agent, or Firm* — Kyle A. Fletcher, Esq.

(57) ABSTRACT

The fish grabbing tool is a device that is designed to grab the side of a fish in situations, such as ice fishing, where the use of a net is inappropriate or cumbersome. The fish grabbing tool positions a first jaw and a second jaw that can be positioned by the head or upper body of the fish. A pull ring is used to operate a grabbing mechanism that secures the first jaw and the second jaw around the fish. The fish grabbing tool comprises a grabbing device, a center post, and a handle.

16 Claims, 4 Drawing Sheets

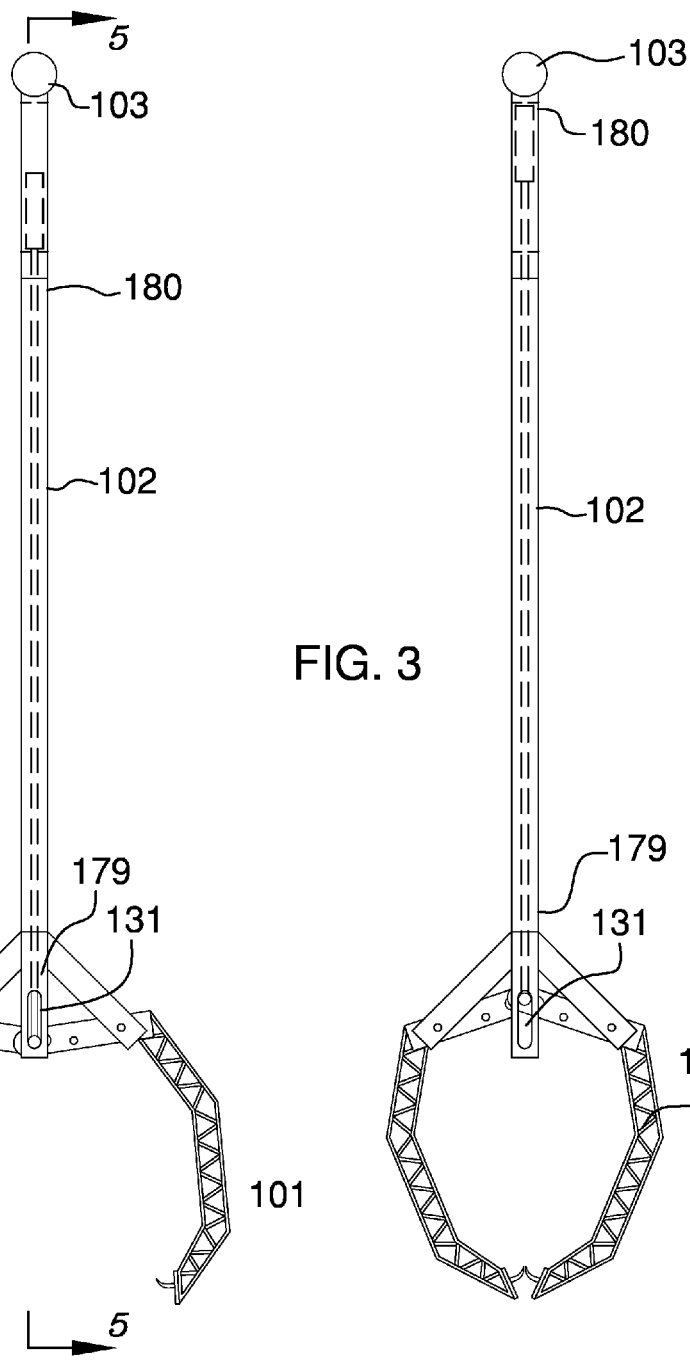

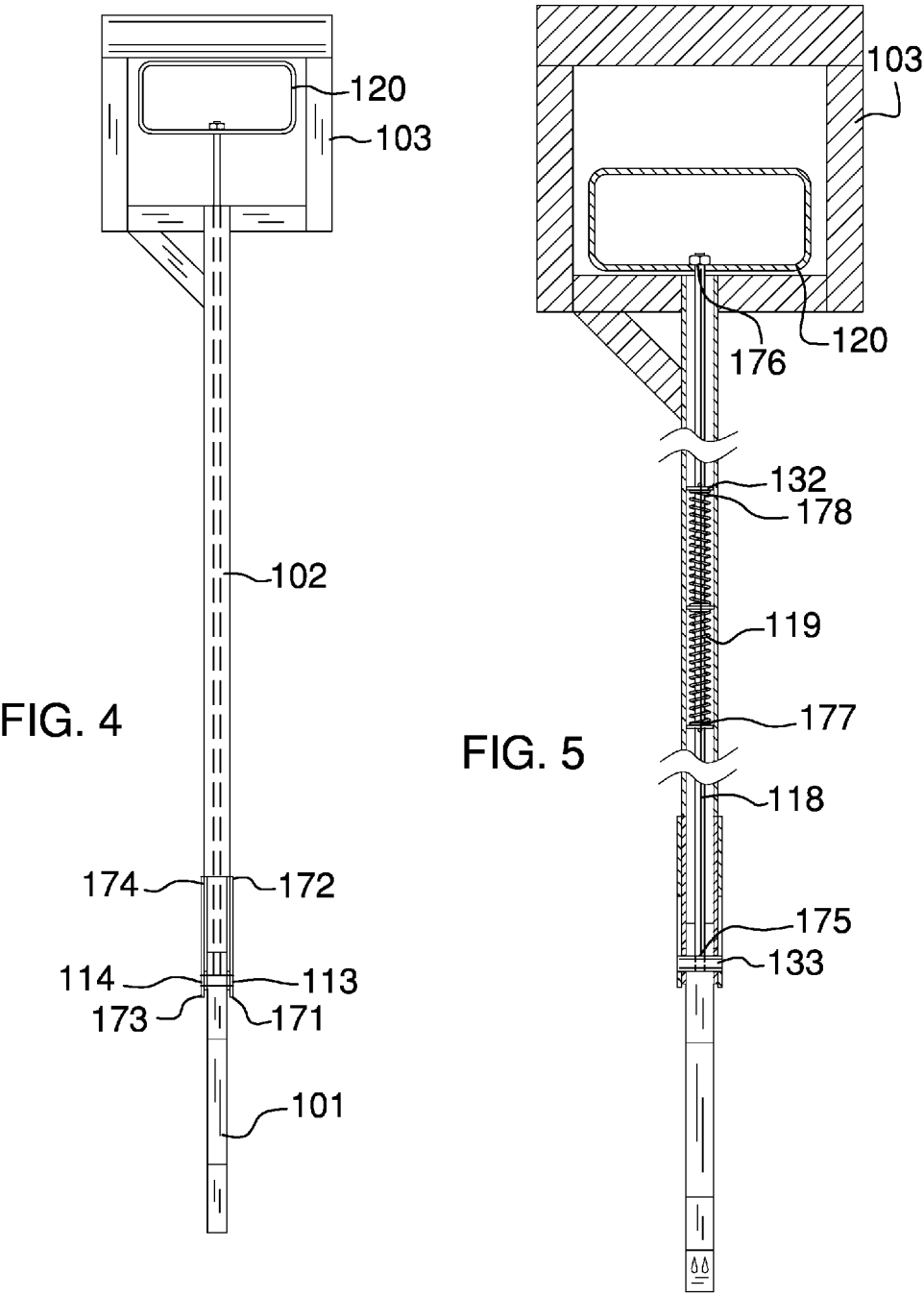

FISH-GRABBING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment, more specifically, a fisherman's tool configured for use in removing caught fish from the water.

SUMMARY OF INVENTION

The fish grabbing tool is a device that is designed to grab the side of a fish in situations, such as ice fishing, where the use of a net is inappropriate or cumbersome. The fish grabbing tool positions a first jaw and a second jaw that can be positioned by the head or upper body of the fish. A pull ring is used to operate a grabbing mechanism that secures the first jaw and the second jaw around the fish.

These together with additional objects, features and advantages of the fish grabbing tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the fish grabbing tool in detail, it is to be understood that the fish grabbing tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fish grabbing tool.

It is therefore important that the claims be regarded as including such equivalent construction insofar as they do not depart from the spirit and scope of the fish grabbing tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an open view of an embodiment of the disclosure.

FIG. 3 is a front view of a closed view of an embodiment of the disclosure.

FIG. 4 is a side view of an embodiment of the disclosure.

FIG. 5 is a cross-sectional view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
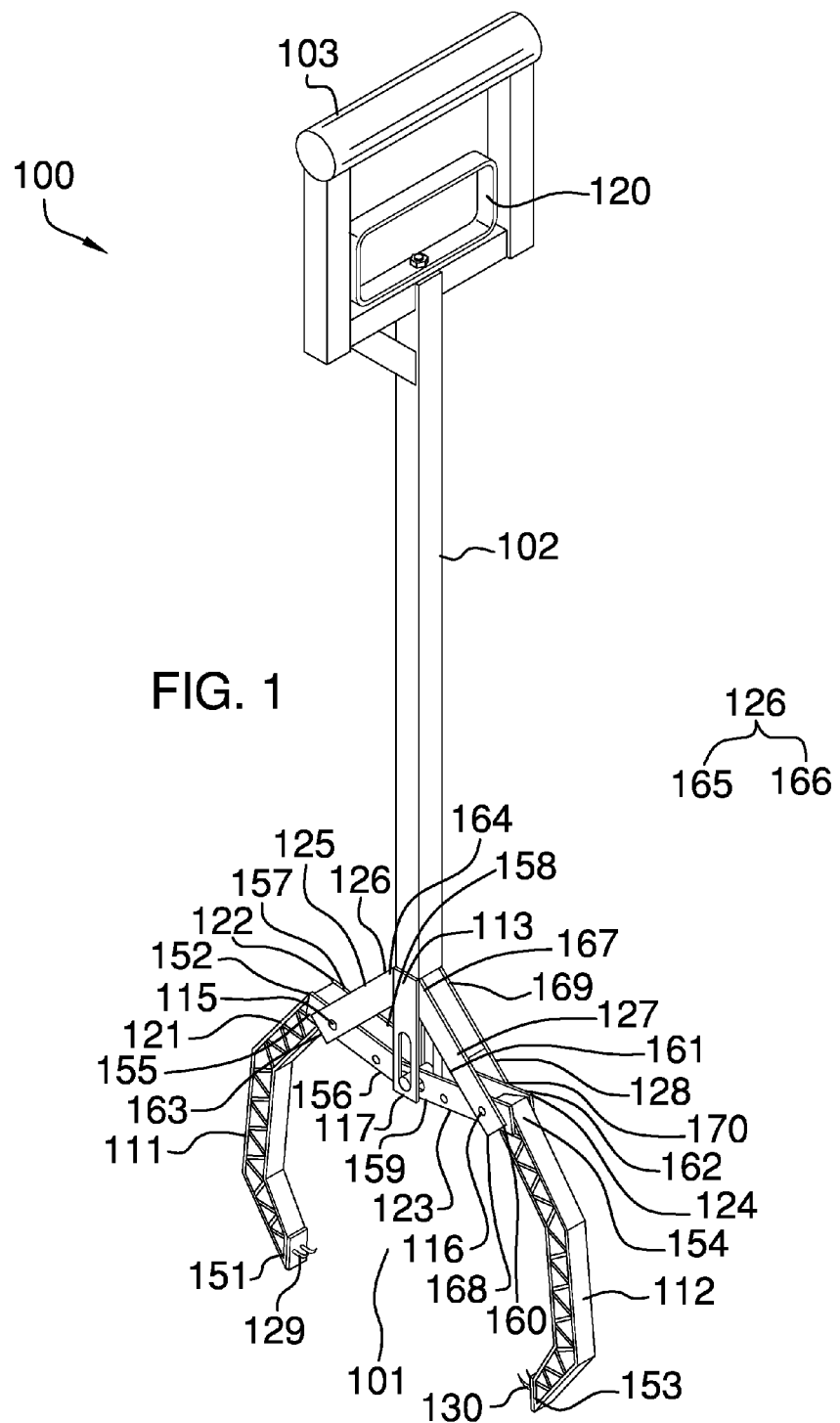
FIG. 1 is a perspective view of an embodiment of the disclosure.
Figure 6:
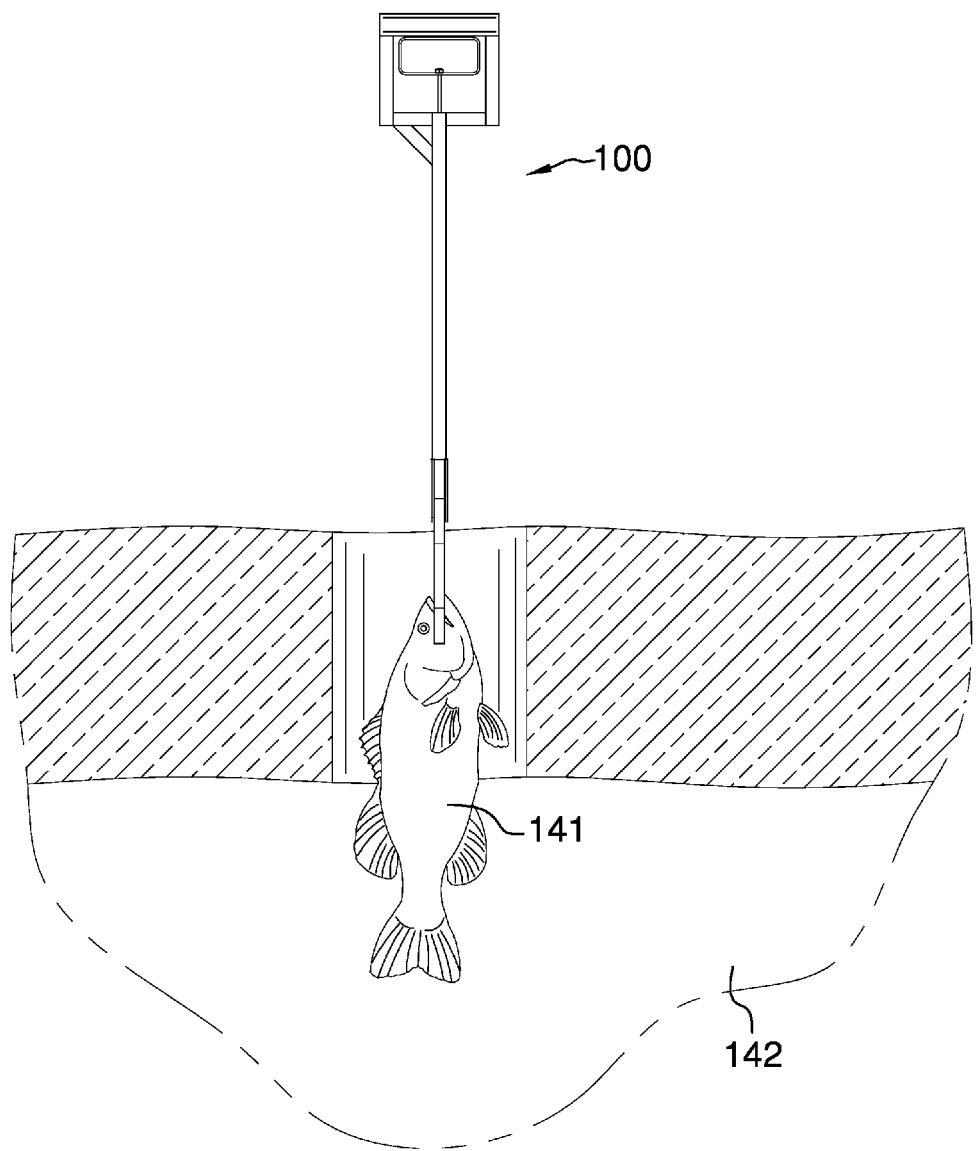
FIG. 6 is an in use view of an embodiment of the disclosure.

Detailed reference will now be made to a first potential embodiment of the disclosure, which is illustrated in FIGS. 1 through 6. The fish grabbing tool 100 (hereinafter invention) comprises a grabbing device 101, a center post 102, and a handle 103.

The center post 102 is a hollow tube that contains elements of the grabbing device 101 and provides rigidity to the invention 100. The center post 102 is further defined with a twenty ninth end 179 and a thirtieth end 180. The handle 103 is a first D grip handle that is attached to the thirtieth end 180 of the center post 102 to allow for the manipulation of the invention 100. The twenty ninth end 179 of the center post 102 is distal from the handle 103.

The grabbing device 101 comprises a first jaw 111, a second jaw 112, a first guide 113, a second guide 114, a first pivot 115, a second pivot 116, a third pivot 117, a pull rod 118, a spring 119, and a pull ring 120. The grabbing device 101 further comprises a first brace 121, a second brace 122, a third brace 123, a fourth brace 124, a fifth brace 125, a sixth brace 126, a seventh brace 127 and an eighth brace 128.

The first brace 121 is further defined with a fifth end 155 and a sixth end 156. The second brace 122 is further defined with a seventh end 157 and an eighth end 158. The third brace 123 is further defined with a ninth end 159 and a tenth end 160. The fourth brace 124 is further defined with an eleventh end 161 and a twelfth end 162. The fifth brace 125 is further defined with a thirteenth end 163 and a fourteenth end 164. The sixth brace 126 is further defined with a fifteenth end and a sixteenth end. The seventh brace 127 is further defined with a seventeenth end 167 and an eighteenth end 168. The eighth brace 128 is further defined with a nineteenth end 169 and a twentieth end 170.

The first jaw 111 is further defined with a first end 151 and a second end 152. The second jaw 112 is further defined with a third end 153 and a fourth end 154. The first guide 113 is further defined with a twenty first end 171 and a twenty second end 172. The second guide 114 is further defined with a twenty third end 173 and a twenty fourth end 174. The pull rod 118 is further defined with a twenty fifth end 175 and a twenty sixth end 176. The spring 119 is further defined with a twenty seventh end 177 and a twenty eighth end 178.

This paragraph and the next four paragraphs describe the assembly of the grabbing device 101. The first jaw 111 is formed in the shape of a half a regular hexagon. The second jaw 112 is formed in the shape of a half a regular hexagon. A first set of spikes 129 attaches to the first end 151 of the first jaw 111. The first set of spikes 129 are used to firmly grasp the fish 141. A second set of spikes 130 attaches to the third end 153 of the second jaw 112. The second set of spikes 130 are used to firmly grasp the fish 141.

The second end 152 of the first jaw 111 is attached to the fifth end 155 of the first brace 121, the seventh end 157 of the second brace 122, the thirteenth end 163 of the fifth brace 125 and the fifteenth end of the sixth brace 126 using the first pivot 115. The first pivot 115 allows rotation of the first jaw 111, first brace 121, second brace 122, the fifth brace 125 and the sixth brace 126 relative to each other around the pivot point provided by the first pivot 115. The fourteenth end 164 of the fifth brace 125 is rigidly attached to the twenty ninth end 179 of the center post 102. The sixteenth end of the sixth brace 126 is rigidly attached to the twenty ninth end 179 of the center post 102. The fourth end 154 of the second jaw 112 is attached to the tenth end 160 of the third brace 123, the twelfth end 162 of the fourth brace 124, the eighteenth end 168 of the seventh brace 127 and the twentieth end 170 of the eighth brace 128 using the second pivot 116. The second pivot 116 allows rotation of the second jaw 112, third brace 123, fourth brace 124, the seventh brace 127 and the eighth brace 128 relative to each other around the pivot point provided by the second pivot 116. The seventeenth end 167 of the seventh brace 127 is rigidly attached to the twenty ninth end 179 of the center post 102. The nineteenth end 169 of the eighth brace 128 is rigidly attached to the twenty ninth end 179 of the center post 102.

The sixth end 156 of the first brace 121, the ninth end 159 of the third brace 123, the eighth end 158 of the second brace 122, the eleventh end 161 of the fourth brace 124, the twenty first end 171 of the first guide 113, the twenty third end 173 of the second guide 114, and the twenty fifth end 175 of the pull rod 118 are joined together using the third pivot 117. The third pivot 117 allows rotation of the first brace 121, third brace 123, second brace 122 and fourth brace 124 relative to each other around the pivot point provided by the third pivot 117. When the pull rod 118 is pulled towards the thirtieth end 180 of the center post 102, the sixth end 156 of the first brace 121, the ninth end 159 of the third brace 123, the eighth end 158 of the second brace 122, the eleventh end 161 of the fourth brace 124 are pulled toward the thirtieth end 180 of the center post 102. This causes the fifth end 155 of the first brace 121 and the seventh end 157 of the second brace 122 to rotate around the first pivot 115 relative to fixed position of the thirteenth end 163 of the fifth brace 125 and the fifteenth end of the sixth brace 126 causing the first end 151 of the first jaw 111 to move towards the third end 153 of the second jaw 112. When the pull rod 118 is pulled towards the thirtieth end 180 of the center post 102, the tenth end 160 of the third brace 123 and the twelfth end 162 of the fourth brace 124 rotate around the second pivot point 116 relative to the fixed position of the eighteenth end 168 of the seventh brace 127 and the twentieth end 170 of the eighth brace 128 causing the third end 153 of the second jaw 112 to move towards the first end 151 of the first jaw 111.

The first guide 113 and the second guide 114 are both flat metal slotted bars. The twenty second end 172 of the first guide 113 is rigidly attached to the twenty ninth end 179 of the center post 102. The twenty fourth end 174 of the second guide 114 is rigidly attached to the twenty ninth end 179 of the center post 102. The third pivot 117 is inserted through the slot 131 of the first guide 113 and the slot 131 of the second guide 114 such that when the pull rod 118 is pulled towards the thirtieth end 180 of the center post 102 the slot 131 of the first guide 113 and the slot 131 of the second guide 114 will guide the direction of movement of the third pivot 117. The pull rod 118 is a shaft that is positioned within the hollow center of the center post 102. The twenty sixth end 176 of the pull rod 118 extends beyond the thirtieth end 180 of the center post 102 and through the handle 103 such that the twenty sixth end 176 of the pull rod 118 can be attached to the pull ring 120. As most clearly shown in FIGS. 4 and 5, the pull ring 120 is a commercially available second D grip handle that is positioned inside the first D grip handle of the handle 103. This allows the user to use the handle 103 for leverage when pulling the pull ring 120 away from the twenty ninth end 179 of the center post 102.

The spring 119 is a helical coil compression spring that is mounted within the center post 102 around the pull rod 118. As shown in FIG. 5, when the pull rod 118 is pulled towards the handle 103, a pull rod flange 132 mounted on the pull rod 118 pushes against a center post flange 133 mounted within the center post 102. This compresses the spring 119. When the pull ring 120 is released the spring 119 relaxes which pushes the first jaw 111 and the second jaw 112 back into the open position 134.

To use the invention 100, the invention 100 is left in the open position 134. The first jaw 111 and the second jaw 112 are positioned around the side of a fish 141. When the pull ring 120 of the invention 100 is pulled away from the twenty ninth end 179 of the center post 102, the first jaw 111 and the second jaw 112 close around the fish 141 securely grabbing the fish 141. In this position, the fish 141 can be pulled out of the water 142. The fish 141 is released by releasing the pull ring 120.

The first potential embodiment of the disclosure is composed entirely of aluminum tubing and aluminum flat bars with the following exceptions: The handle 103 and the pull ring 120 are commercially purchased and need not be metal. The spring is commercially available and need not be made of aluminum. The remaining joinings and attachments described in this disclosure can be welded or formed with commercially available hardware. In the first potential embodiment of the disclosure, the remaining joinings and attachments were welded. If commercially available hardware is used. The commercially available hardware need not be aluminum.

The following definition was used in this disclosure:

Pivot: As used in this disclosure, a pivot is a rod or shaft around which an object rotates or swings.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tool comprising:
a grabbing device; a center post, and handle;
wherein the tool is adapted for grabbing a fish;
wherein the grabbing device grasps the fish using a first jaw and a second jaw;
wherein the first jaw and the second jaw are controlled using a plurality of braces and a plurality of pivots that are linked together;
wherein the grabbing device comprises a first jaw, a second jaw, a first guide, a second guide, a first pivot, a second pivot, a third pivot, a pull rod, a spring, and a pull ring;
wherein the grabbing device further comprises a first brace, a second brace, a third brace, a fourth brace, a fifth brace, a sixth brace, a seventh brace and an eighth brace;
wherein the first brace is further defined with a fifth end and a sixth end;
wherein the second brace is further defined with a seventh end and an eighth end;
wherein the third brace is further defined with a ninth end and a tenth end;
wherein the fourth brace is further defined with an eleventh end and a twelfth end;
wherein the fifth brace is further defined with a thirteenth end and a fourteenth end;
wherein the sixth brace is further defined with a fifteenth end and a sixteenth end;
wherein the seventh brace is further defined with a seventeenth end and an eighteenth end;
wherein the eighth brace is further defined with a nineteenth end and a twentieth end;
wherein the first jaw is further defined with a first end and a second end;
wherein the second jaw is further defined with a third end and a fourth end;
wherein the first guide is further defined with a twenty first end and a twenty second end;
wherein the second guide is further defined with a twenty third end and a twenty fourth end;
wherein the pull rod is further defined with a twenty fifth end and a twenty sixth end;
wherein the spring is further defined with a twenty seventh end and a twenty eighth end;
wherein the center post further comprises a twenty ninth end and a thirtieth end.

2. The tool according to claim 1 wherein
the first jaw is formed in the shape of a half a regular hexagon
wherein the second jaw is formed in the shape of a half a regular hexagon.

3. The tool according to claim 2 wherein
a first set of spikes is attached to the first end of the first jaw;
wherein a second set of spikes is attached to the third end of the second jaw.

4. The tool according to claim 3 wherein the second end of the first jaw is attached to the fifth end of the first brace, the seventh end of the second brace, the thirteenth end of the fifth brace and the fifteenth end of the sixth brace using the first pivot.

5. The tool according to claim 4 wherein
the fourteenth end of the fifth brace is rigidly attached to the twenty ninth end of the center post;
wherein the sixteenth end of the sixth brace is rigidly attached to the twenty ninth end of the center post.

6. The tool according to claim 5 wherein the fourth end of the second jaw is attached to the tenth end of the third brace, the twelfth end of the fourth brace, the eighteenth end of the seventh brace and the twentieth end of the eighth brace using the second pivot.

7. The tool according to claim 6 wherein
the seventeenth end of the seventh brace is rigidly attached to the twenty ninth end of the center post;
wherein the nineteenth end of the eighth brace is rigidly attached to the twenty ninth end of the center post.

8. The tool according to claim 7 wherein the sixth end of the first brace, the ninth end of the third brace, the eighth end of the second brace, the eleventh end of the fourth brace, the twenty first end of the first guide, the twenty third end of the second guide, and the twenty fifth end of the pull rod are joined together using the third pivot.

9. The tool according to claim 8 wherein the
first guide is a flat metal slotted bar;
wherein the second guide is a flat metal slotted bar.

10. The tool according to claim 9 wherein the
twenty second end of the first guide is rigidly attached to the twenty ninth end of the center post;
wherein the twenty fourth end of the second guide is rigidly attached to the twenty ninth end of the center post.

11. The tool according to claim 10 wherein the
third pivot is inserted through the slot of the first guide and the slot of the second guide such that when the pull rod is pulled towards the thirtieth end of the center post the slot of the first guide and the slot of the second guide will guide the direction of movement of the third pivot;
wherein third pivot further allows rotation of the first brace, third brace, second brace and fourth brace relative to each other around the pivot point provided by the third pivot;
wherein when the pull rod is pulled towards the thirtieth end of the center post, the sixth end of the first brace, the ninth end of the third brace, the eighth end of the second brace, and the eleventh end of the fourth brace are pulled toward the thirtieth end of the center post causing the fifth end of the first brace and the seventh end of the second brace to rotate around the first pivot relative to fixed position of the thirteenth end of the fifth brace and the fifteenth end of the sixth brace causing the first end of the first jaw to move towards the third end of the second jaw;
wherein when the pull rod is pulled towards the thirtieth end of the center post, the tenth end of the third brace and the twelfth end of the fourth brace rotate around the second pivot point relative to the fixed position of the eighteenth end of the seventh brace and the twentieth end of the eighth brace causing the third end of the second jaw to move towards the first end of the first jaw.

12. The tool according to claim 11 wherein the pull rod is a shaft.

13. The tool according to claim 12 wherein the pull rod is positioned within the hollow center of the center post.

14. The tool according to claim 13 wherein the twenty sixth end of the pull rod extends beyond the thirtieth end of the center post and through the handle such that the twenty sixth end of the pull rod can be attached to the pull ring.

15. The tool according to claim 14 wherein the spring is a helical coil compression spring.

16. The tool according to claim 15 wherein the spring is mounted within the center post around the pull rod.

* * * * *